US009838170B2

(12) United States Patent
Fattouche et al.

(10) Patent No.: US 9,838,170 B2
(45) Date of Patent: Dec. 5, 2017

(54) ROOT NON-ORTHOGONAL FREQUENCY DIVISION MULTIPLEXING (RNOFDM)

(71) Applicant: Taiwan Semiconductor Manufacturing Co., Ltd., Hsinchu (TW)

(72) Inventors: Michel Fattouche, Calgary (CA); David Gell, San Diego, CA (US); Murat Karsi, San Diego, CA (US); Kenneth Stanwood, Vista, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 85 days.

(21) Appl. No.: 14/857,416

(22) Filed: Sep. 17, 2015

(65) Prior Publication Data

US 2017/0085347 A1    Mar. 23, 2017

(51) Int. Cl.
H04W 4/00      (2009.01)
H04L 5/00      (2006.01)
H04W 72/04     (2009.01)
H04W 72/08     (2009.01)
H04L 27/26     (2006.01)

(52) U.S. Cl.
CPC .......... H04L 5/0007 (2013.01); H04L 5/0098 (2013.01); H04L 27/2601 (2013.01); H04W 72/0406 (2013.01); H04W 72/082 (2013.01)

(58) Field of Classification Search
None
See application file for complete search history.

(56) References Cited

U.S. PATENT DOCUMENTS

| 5,297,161 | A  | * | 3/1994  | Ling ...................... H04B 1/707 375/130 |
| 6,782,036 | B1 | * | 8/2004  | Dowling .............. H04B 1/7105 375/130 |
| 7,551,547 | B2 | * | 6/2009  | Ghosh ................. H04L 25/0216 370/208 |
| 8,331,454 | B2 | * | 12/2012 | Bjontegaard ......... G06F 17/147 375/240.18 |

(Continued)

OTHER PUBLICATIONS

Ahmad, et al., "Soft-feedback MMSE Equalization for Non-Orthogonal Frequency Division Multiplexing (n-OFDM) Signal Detection," 2012 International ITG Workshop on Smart Antennas (WSA).

(Continued)

Primary Examiner — Bob Phunkulh
(74) Attorney, Agent, or Firm — JCIPRNET

(57) ABSTRACT

A method for transmission by a transmitting node in a communication network using a plurality of non-orthogonal carriers, including obtaining, by a processor in the transmitting node, an information element data set comprised of a first number of elements, applying, by the processor, a transform matrix to the information element data set to obtain an output samples data set comprised of a second number of elements, the transform matrix being based on a non-linear function applied to a non-orthogonal frequency division matrix comprised of a plurality of columns wherein each column is associated one of the plurality of non-orthogonal carriers, and transmitting the output samples data set from a transmitter in the transmitting node.

22 Claims, 7 Drawing Sheets

(56) References Cited

U.S. PATENT DOCUMENTS

| | | | | |
|---|---|---|---|---|
| 2015/0161516 | A1* | 6/2015 | Ghassemzadeh | G06N 99/005 706/12 |
| 2015/0304146 | A1* | 10/2015 | Yang | H04L 5/0066 370/329 |
| 2016/0065257 | A1* | 3/2016 | Fujii | H04B 7/0413 375/267 |

OTHER PUBLICATIONS

Alavi, et al., "PAPR reduction of OFDM signals using partial transmit sequence: an optimal approach using sphere decoding," IEEE Communications Letters, vol. 9, No. 11, pp. 982-984, Nov. 2005.

Anwar, "Peak power reduction for multicarrier systems in satellite and radio communications," Ph.D. dissertation, Nara Institute of Science and Technology, Mar. 2008.

Bharadwaj, et al., "Low Complexity Detection Scheme for NOFDM Systems Based on ML Detection over Hyperspheres," 2011 International Conference on Devices and Communications (ICDeCom).

Björck et al., "Loss and Recapture of Orthogonality in the Modified Gram-Schmidt Algorithm," SIAM Journal on Matrix Analysis and Applications, vol. 13, No. 1, pp. 176-190, Jan. 1992.

Clegg, et al., "A practical system for improved efficiency in frequency division multiplexed wireless networks," Communications, IET, vol. 6, Issue: 4, Feb. 2012, pp. 449-457.

Hamamura, et al., "Bandwidth efficiency improvement for multicarrier systems," in 15th IEEE International Symposium on Personal, Indoor and Mobile Radio Communications, 2004 (PIMRC 2004), vol. 1, Sep. 2004, pp. 48-52.

Hamamura, et al., "Spectral Efficiency of Orthogonal Set of Truncated MC-CDMA Signals Using Discrete Prolate Spheroidal Sequences," IEEE Wireless Communications and Networking Conference, 2008 (WCNC 2008) pp. 980-984.

Hayashi, et al., "Complexity-reduced decoding algorithm for unmodulated parallel-combinatory high-compaction multicarrier modulation signals," International Conference on Innovations in Information Technology, 2008 (IIT 2008) pp. 49-53.

Hou, et al., "Bandwidth efficiency of PC-OFDM systems with high compaction multi-carrier modulation," IEEE Proc. International conference on wireless communications, networking and mobile computing, vol. 1, pp. 197-200, 2005.

Sam, "Spectrally Efficient FDM Communication Signals and Transceivers: Design, Mathematical Modelling and System Optimization," Ph.D. dissertation, University College London, Oct. 2011.

Isam, et al., "A Truncated SVD approach for fixed complexity spectrally efficient FDM receivers," IEEE Wireless Communications and Networking Conference (WCNC 2011) pp. 1584-1589.

Isam, et al., "Simple DSP-IDFT techniques for generating spectrally efficient FDM signals," in 7th International Symposium on Communication System Networks and Digital Signal Processing (CSNDSP), 2010, pp. 20-24.

Jian, "The Prefix Design and Performance Analysis of DFT-based Overlapped Frequency Division Multiplexing (OvFDM-DFT) System," 3rd International Workshop on Signal Design and Its Applications in Communications, 2007 (IWSDA 2007), pp. 361-364.

Jiang, et al., "A New Time Division Multiplexing Technique," International Conference on Wireless Communications, Networking and Mobile Computing, 2007 (WiCom 2007), pp. 771-774.

Kanaras, et al., "A combined MMSE-ML detection for a spectrally efficient non orthogonal FDM signal," in Broadband Communications, Networks and Systems, 2008. 5th International Conference on BROADNETS 2008, Sep. 2008, pp. 421-425.

Kanaras, et al., "A New Quasi-Optimal Detection Algorithm for a Non Orthogonal Spectrally Efficient FDM," 9th ntemational Symposium on Communications and Information Technology, 2009 (ISCIT 2009), pp. 460-465.

Kanaras, et al., "Investigation of a Semidefinite Programming detection for a spectrally efficient FDM system," IEEE 20th International Symposium on Personal, Indoor and Mobile Radio Communications, 2009, pp. 2827-2832.

Kanaras, et al., "Spectrally efficient FDM signals: Bandwidth gain at the expense of receiver complexity," in IEEE International Conference on Communications, 2009 (ICC '09), Jun. 2009, pp. 1-6.

Kliks, et al., "A Pragmatic Bit and Power Allocation Algorithm for NOFDM Signalling," IEEE Wireless Communications and Networking Conference, 2009 (WCNC 2009).

Mo, et al., "Near Optimum Sequence Detection for Coded OFDM-CMM Systems," Third International Conference on Communications and Networking in China, 2008 (ChinaCom 2008), pp. 522-526.

Sun, et al., "Lattice reduction aided MMSE-SIC detection for non-orthogonal frequency division multiplexing signals," Third International Conference on Communications and Networking in China, 2008 (ChinaCom 2008).

Takahashi, et al., "A Demodulation Complexity Reduction Method Using M-Algorithm for High Compaction Multi-Carrier Modulation Systems," 1st International Symposium on Wireless Communication Systems, 2004, pp. 418-422.

Tarokh, et al., "Construction of OFDM M-QAM sequences with low peak-to-average power ratio," IEEE Transactions on Communications, vol. 51, No. 1, pp. 25-28, Jan 2003.

Xiong, "M-ary amplitude shift keying OFDM system," IEEE Transactions on Communications, vol. 51, No. 10, pp. 1638-1642, Oct. 2003.

Yang, et al. "A Fast Decoding Algorithm for Non-orthogonal Frequency Division Multiplexing Signals," IEEE Proc. ChinaCom, Shanghai, China, Aug. 2007.

Zhang, et al., "NOFDM System Based on Circular Conjugate Symmetry Properties of DFT," 4th International Conference on Wireless Communications, Networking and Mobile Computing, 2008 (WiCOM '08).

Zhang, et al., "A Novel Orthogonal Transmission Scheme for Non-Orthogonal Multi-Carrier Signal," 3rd IEEE International Conference on Broadband Network and Multimedia Technology (IC-BNMT), 2010 pp. 467-471.

Zhang, et al., "The analysis of coded Overlapped Time Division Multiplexing system," 3rd IEEE International Conference on Broadband Network and Multimedia Technology (IC-BNMT), 2010, pp. 488-494.

Zhao, et al., "A new method for PAR reduction of OFDM system," Global Mobile Congress 2009, pp. 1-5.

Zhao, et al., "Sphere-Decoding of OvTDM," 3rd International Workshop on Signal Design and Its Applications in Communications, 2007 (IWSDA 2007), pp. 22-25.

Rodrigues, et al., "A Spectrally Efficient Frequency Division Multiplexing Based Communication System," in 8th International OFDM Workshop, Hamburg, Germany, Sep. 2003, pp. 70-74.

Rodrigues, et al., "Fast OFDM: A Proposal for Doubling the Data Rate of OFDM Schemes," in Proceedings of the International Conference on Telecommunications, Beijing, China, Jun. 2002, pp. 483-486.

Kanaras, et al., "An Optimum Detection for a Spectrally Efficient non Orthogonal FDM System," in 13th International OFDM Workshop, Hamburg, Germany, Aug. 2008. pp. 65-69.

* cited by examiner

US 9,838,170 B2

ROOT NON-ORTHOGONAL FREQUENCY DIVISION MULTIPLEXING (RNOFDM)

FIELD OF THE INVENTION

The aspects described herein relate to an improvement over Orthogonal Frequency Division Multiplexing (OFDM), namely Root Non-Orthogonal Frequency Division Multiplexing (RNOFDM), for use in wireless communication systems such as, for example, Wi-Fi (IEEE 802.11 standards) and LTE (3GPP standards).

BACKGROUND

Orthogonal Frequency Division Multiplexing (OFDM) is a known technology for wireless communication that has the benefit of low equalization complexity. Currently, Wi-Fi utilizes OFDM for both its uplink and downlink transmissions, and LTE utilizes OFDM for its downlink transmissions.

One way to increase the transmission rate of an OFDM signal without increasing its equalization complexity is to relax the orthogonal nature of the signal; however, this increased rate may come at the expense of a more complex detection algorithm at the receiver. One way to achieve this increased transmission rate is by increasing the number of subcarriers in one OFDM symbol, while preserving its duration and bandwidth. Such a modulation technique is referred to herein as Non-Orthogonal Frequency Division Multiplexing (NOFDM). In an example of a NOFDM system, a plurality of non-orthogonal carriers is utilized for transmission. As used herein, a plurality of non-orthogonal carriers is a set of carriers in which at least some of the carriers are non-orthogonal to each other. In such a system, the plurality of non-orthogonal carriers may also include carriers which are orthogonal to each other.

Aspects of NOFDM are known to those skilled in the art; however, NOFDM has not been adopted in any standards due to its inability to deliver significant improvement in capacity over the capacity delivered by OFDM. There is a need for a NOFDM technique that provides an improvement in capacity over the capacity delivered by OFDM, while maintaining a low equalization complexity.

SUMMARY

Systems, devices and methods for Root Non-Orthogonal Frequency Division Multiplexing (RNOFDM) are provided herein.

In an aspect, a method is provided for method for transmission by a transmitting node in a communication network using a plurality of non-orthogonal carriers. The method includes obtaining, by a processor in the transmitting node, an information element data set comprised of a first number of elements, applying, by the processor, a transform matrix to the information element data set to obtain an output samples data set comprised of a second number of elements, the transform matrix being based on a non-linear function applied to a non-orthogonal frequency division matrix comprised of a plurality of columns wherein each column is associated with one of the plurality of non-orthogonal carriers, and transmitting the output samples data set from a transmitter in the transmitting node.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Systems, devices and methods for conducting interference resolution in a communication system are provided.

The systems and methods disclosed herein can be applied to various types of communication systems, including wireless communication systems and wired communication systems. For example, the systems and methods disclosed herein may be used with Cellular 4G (including Long Term Evolution (LTE), LTE Advanced, and WiMAX), 5G, cellular backhaul, Wi-Fi, Ultra Mobile Broadband (UMB), and other point-to-point or point-to-multipoint wireless technologies, including communication systems used in wireless personal area networks (WPAN), wireless local area networks (WLAN), wireless metropolitan area networks (WMAN) and wireless wide area networks (WWAN). The systems and methods disclosed herein may also be implemented in wired communication systems including, but not limited to, hybrid fiber-coax cable modem systems. For concise exposition, the descriptions provided herein use terminology and aspects of particular communication technologies and standards; however, the devices, systems and methods described herein are also broadly applicable to other communication technologies and standards, both wired and wireless.

Figure 1:
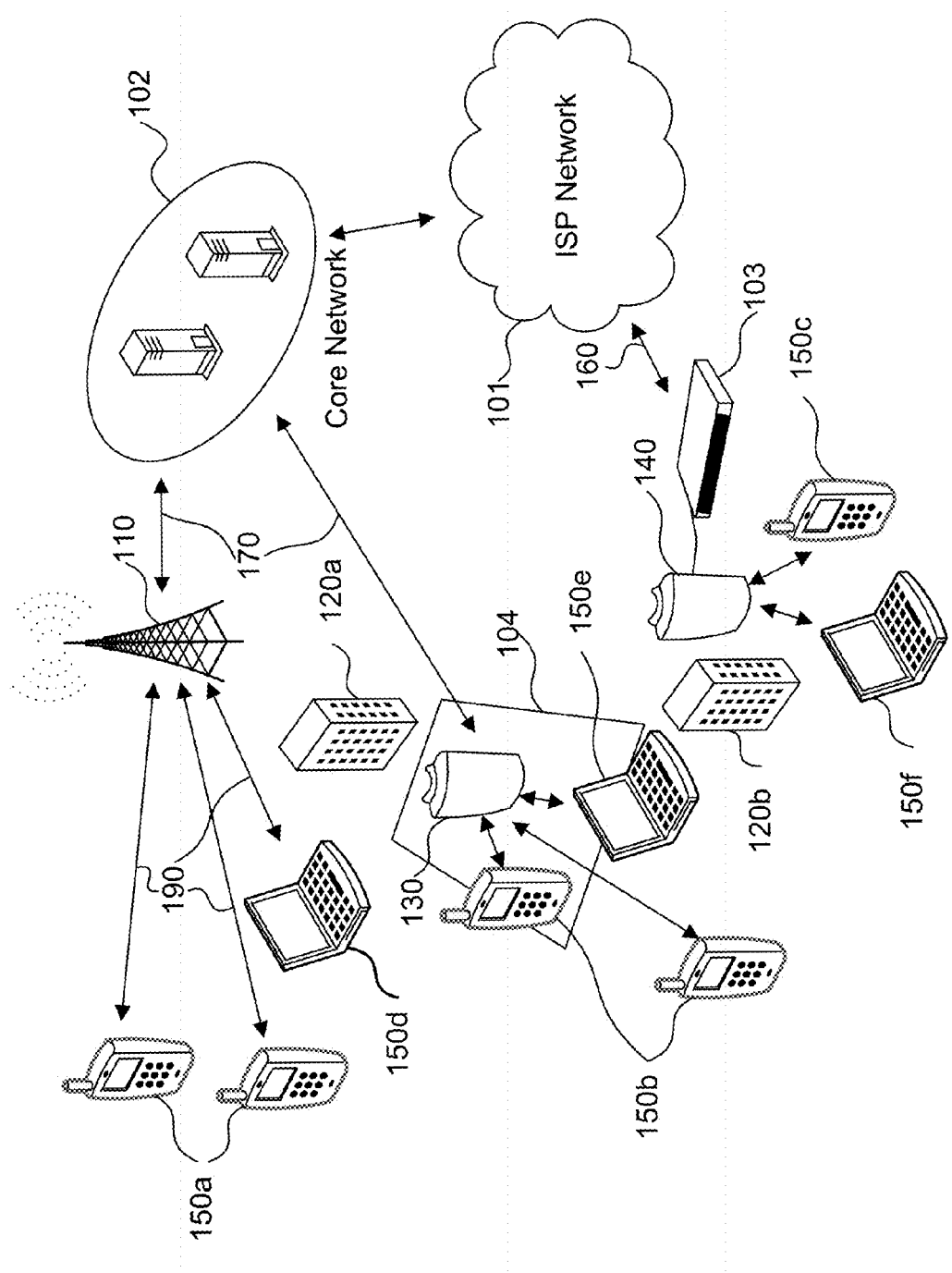
FIG. 1 is a block diagram of a communication network in which systems and methods disclosed herein may be implemented in accordance with aspects of the invention.

FIG. 1 is a block diagram of a communication network in which systems and methods disclosed herein may be implemented in accordance with aspects of the invention. A macro base station (access node) 110 is connected to a core network 102 through a backhaul connection 170. In an embodiment, the backhaul connection 170 is a bidirectional link or two unidirectional links. The direction from the core network 102 to the macro base station 110 is referred to as the downstream or downlink (DL) direction. The direction from the macro base station 110 to the core network 102 is referred to as the upstream or uplink (UL) direction. Subscriber stations (terminal nodes) 150a and 150d can connect to the core network 102 through the macro base station 110. Wireless links 190 between subscriber stations 150 and the macro base station 110 are bidirectional point-to-multipoint links, in an embodiment. The direction of the wireless links 190 from the macro base station 110 to the subscriber stations 150 is referred to as the downlink or downstream direction. The direction of the wireless links 190 from the subscriber stations 150 to the macro base station 110 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 150 access content over the wireless links 190 using base stations (access nodes), such as the macro base station 110, as a bridge.

In the network configuration illustrated in FIG. 1, an office building 120(1) causes a coverage shadow 104. A pico station (access node) 130 can provide coverage to subscriber stations (terminal nodes) 150b and 150e in the coverage shadow 104. The pico station 130 is connected to the core network 102 via a backhaul connection 170. The subscriber stations 150b and 150e may be connected to the pico station 130 via links that are similar to or the same as the wireless links 190 between subscriber stations 150a and 150d and the macro base station 110.

In office building 120b, an enterprise femto base station (access node) 140 provides in-building coverage to subscriber stations (terminal nodes) 150c and 150f. The enterprise femto base station 140 can connect to the core network 102 via an internet service provider network 101 by utilizing a broadband connection 160 provided by an enterprise gateway 103.

Figure 2:
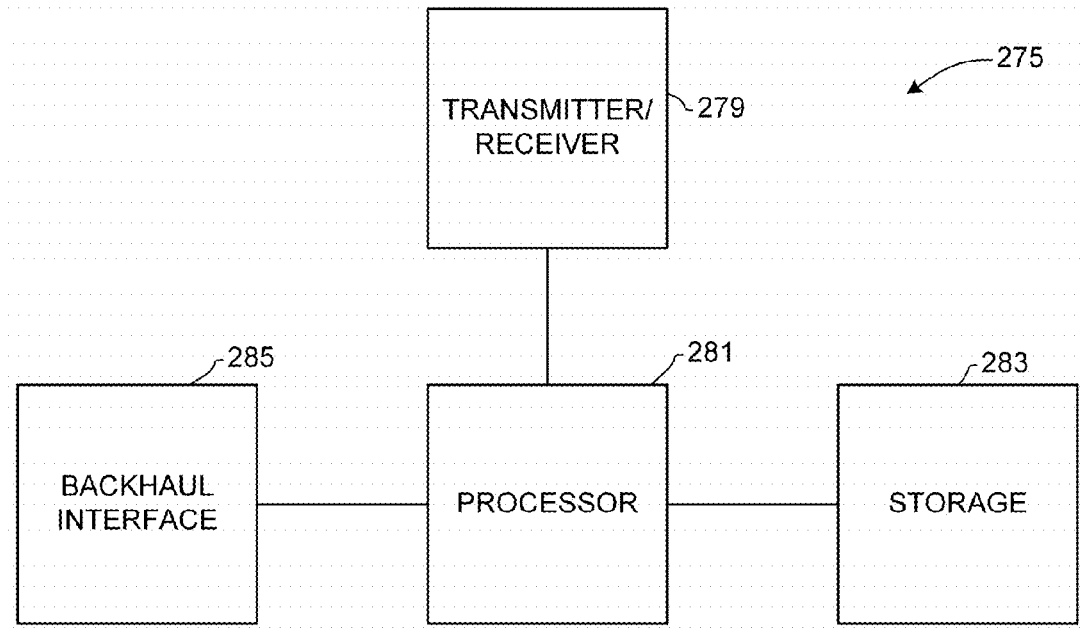
FIG. 2 is a block diagram of an access node in accordance with aspects of the invention.

FIG. 2 is a functional block diagram of a base station 275 in accordance with aspects of the invention. In various embodiments, the base station 275 may be a mobile WiMAX base station, an LTE evolved Node B (eNB or eNodeB), or other wireless base station or access node of various form factors. For example, the macro base station 110, the pico station 130, the enterprise femto base station 140 of FIG. 1 may be provided, for example, by base station 275 of FIG. 2. Base station 275 includes a processor 281 that is coupled to a transmitter-receiver (transceiver) 279, a backhaul interface 285, and storage 283.

Transmitter-receiver 279 is configured to transmit and receive communications wirelessly with other devices. Base station 275 generally includes one or more antennae for transmission and reception of radio signals. The communications of transmitter-receiver 279 may be with one or more terminal nodes.

Backhaul interface 285 provides communication between the base station 275 and a core network. This communication may include communications directly or indirectly (through intermediate devices) with other base stations, for example to implement the LTE X2 interface. The communication may be over a backhaul connection such as, for example, the backhaul connection 170 of FIG. 1. Communications received via the transmitter-receiver 279 may be transmitted, after processing, on the backhaul connection via backhaul interface 285. Similarly, communication received from the backhaul connection via backhaul interface 285 may be transmitted by the transmitter-receiver 279. Although the base station 275 of FIG. 2 is shown with a single backhaul interface 285, other embodiments of the base station 275 may include multiple backhaul interfaces. Similarly, the base station 275 may include multiple transmitter-receivers. In such a scenario, the multiple backhaul interfaces and transmitter-receivers may operate according to different protocols. Communications originating within the base station 275, such as communications with other base stations, may be transmitted on one or more backhaul connections by backhaul interface 285. Similarly, communications destined for base station 275 may be received from one or more backhaul connections via backhaul interface 285.

Processor 281 can process communications being received and transmitted by the base station 275. Storage 283 stores data for use by the processor 281. Storage 283 may also be used to store computer readable instructions for execution by processor 281. The computer readable instructions can be used by base station 275 for accomplishing the various functions of base station 275. In an aspect, storage 283, or parts of storage 283, may be considered a non-transitory machine readable medium. For concise explanation, base station 275 or aspects of base station 275 are described as having certain functionality. It will be appreciated that in some embodiments, this functionality is accomplished by processor 281 in conjunction with storage 283, transmitter-receiver 279, and backhaul interface 285. Furthermore, in addition to executing instructions, processor 281 may include specific purpose hardware to accomplish some functions.

Figure 3:
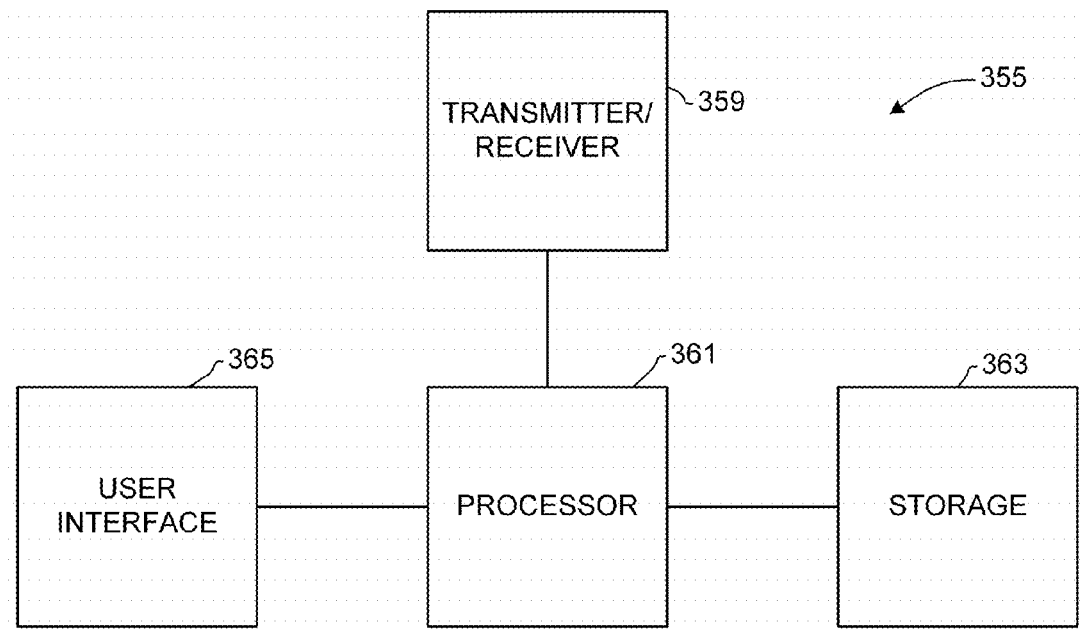
FIG. 3 is a block diagram of a terminal node in accordance with aspects of the invention.

FIG. 3 is a functional block diagram of a terminal node 355 in accordance with aspects of the invention. In various embodiments, terminal node 355 may be a mobile WiMAX subscriber station, an LTE user equipment, or other wireless terminal node of various form factors. The subscriber stations 150 of FIG. 1 may be provided, for example, by terminal node 355 of FIG. 3. Terminal node 355 includes a processor 361 that is coupled to a transmitter-receiver (transceiver) 359, a user interface 365, and storage 363.

Transmitter-receiver 359 is configured to transmit and receive communications with other devices. For example, transmitter-receiver 359 may communicate with base station 275 of FIG. 2 via its transmitter-receiver 279. Terminal node 355 generally includes one or more antennae (not shown) for transmission and reception of radio signals. Although terminal node 355 of FIG. 3 is shown with a single transmitter-receiver 359, other embodiments of terminal node 355 may include multiple transmitter-receivers. In such a scenario, the multiple transmitter-receivers may operate according to different protocols.

Terminal node 355, in many aspects, provides data to and receives data from a person (user). Accordingly, terminal node 355 includes user interface 365. User interface 365 includes functionality for communicating with a person. User interface 365, in an aspect, includes a speaker and a microphone for voice communications with the user, a screen for providing visual information to the user, and a keypad for accepting alphanumeric commands and data from the user. In some aspects, a touch screen may be used in place of or in combination with the keypad to allow graphical inputs in addition to alphanumeric inputs. In an alternate aspect, user interface 365 includes a computer interface, for example, a universal serial bus (USB) interface, to interface terminal node 355 to a computer. For example, terminal node 355 may be in the form of a dongle that can be connected to a notebook computer via user interface 365. The combination of computer and dongle may also be considered a terminal node. User interface 365 may have other configurations and include functions such as vibrators, cameras, and lights.

Processor 361 can process communications being received and transmitted by terminal node 355. Processor 361 can also process inputs from and outputs to user interface 365. Storage 363 stores data for use by processor 361. Storage 363 may also be used to store computer readable instructions for execution by processor 361. The computer readable instructions may be used by terminal node 355 for accomplishing the various functions of terminal node 355. In an embodiment, storage 363, or parts of storage 363, may be considered a non-transitory machine readable medium. For concise explanation, terminal node 355 or aspects of terminal node 355 are described as having certain functionality. It should be appreciated that in some aspects, this functionality is accomplished by processor 361 in conjunction with storage 363, transmitter-receiver 359, and user interface 365. Furthermore, in addition to executing instructions, processor 361 may include specific purpose hardware to accomplish some functions.

Figure 4:
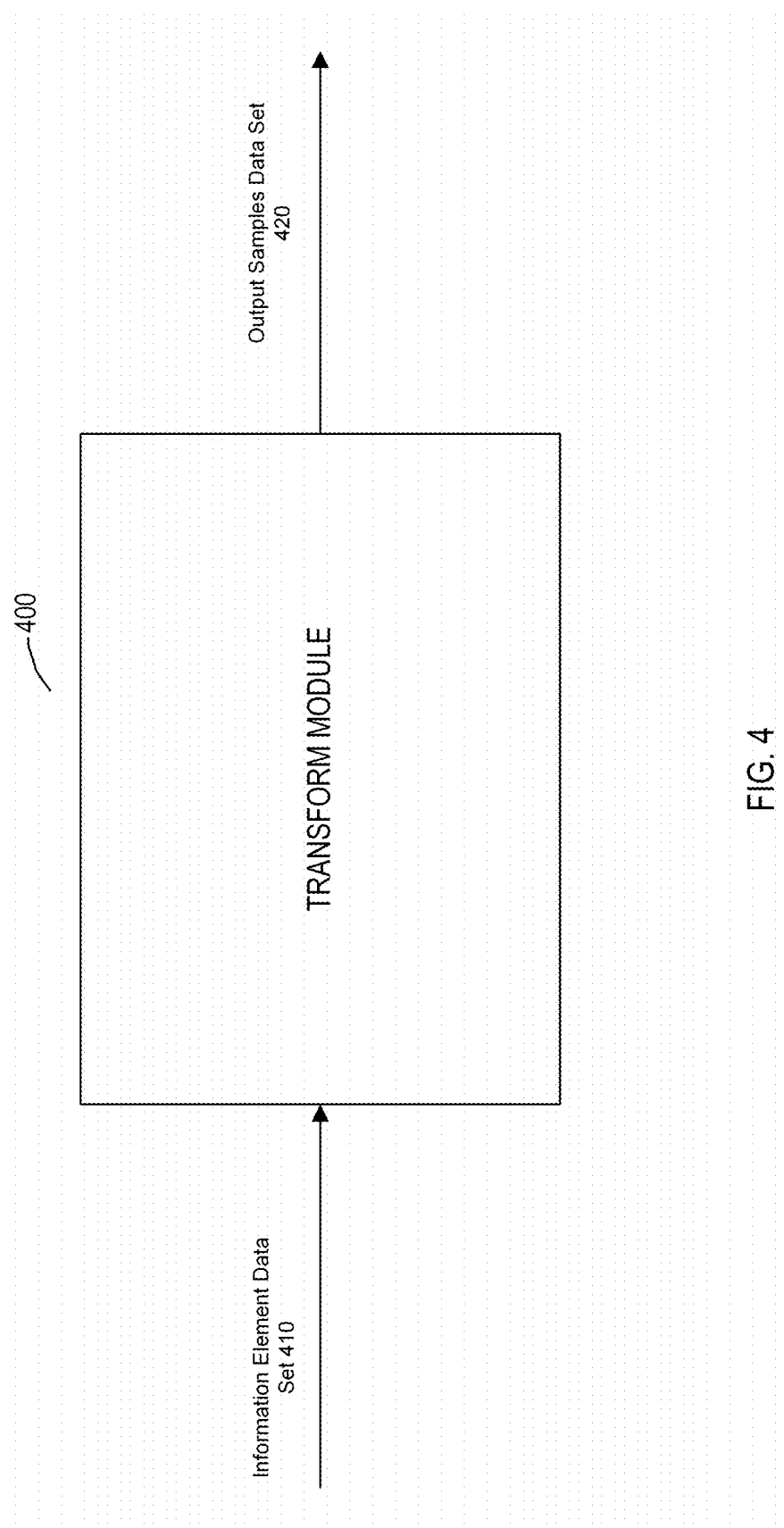
FIG. 4 is a block diagram of a transform module in accordance with aspects of the invention.

FIG. 4 is a block diagram of transform module 400 that is used in implementing root non-orthogonal frequency division multiplexing (RNOFDM) according to aspects of the invention. Transform module 400 receives, or accesses, information element data set 410 that may be comprised of, for example, data elements that are to be transferred by a transmitter chain in a communication system. Information element data set 410 may be arranged in any type of known data arrangement or structure such as, for example, an array, a matrix, a record, an object, a data set, etc. Transform module 400 applies a data set transform to generate output samples data set 420 which may be transmitted in a communication system by a transmitter chain, thereby implementing root non-orthogonal frequency division multiplexing (RNOFDM). The data set transform that is applied by transform module may be a matrix, a table, or other known data structure. Output samples data set 420 may be arranged in any type of known data arrangement or structure such as, for example, an array, a matrix, a record, an object, a data set, etc.

Figure 5:
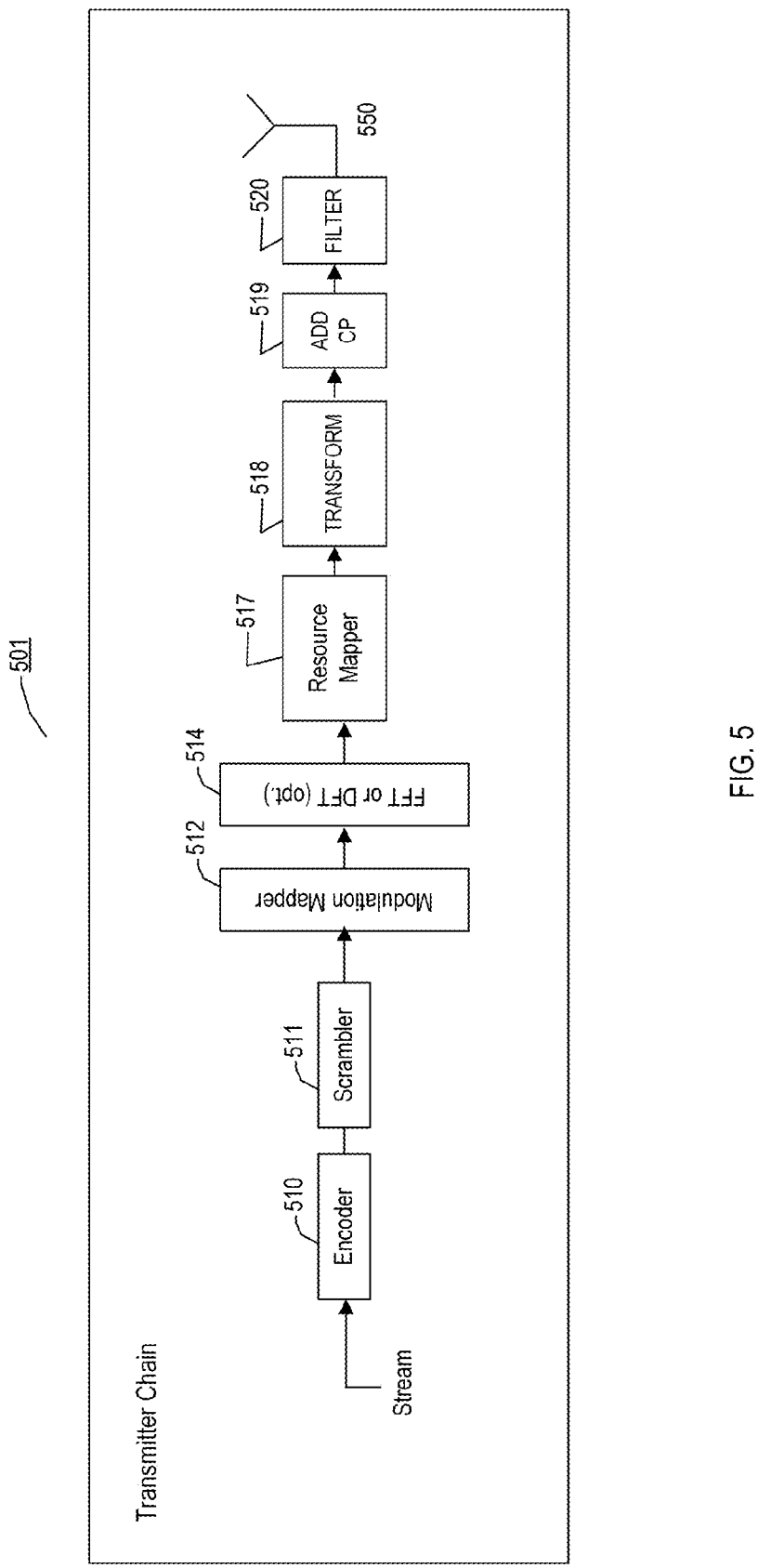
FIG. 5 is a block diagram of a transmitter chain in accordance with aspects of the invention.

FIG. 5 is a block diagram of a transmitter chain 501 in accordance with aspects of the invention. Transmitter chain 501 is used herein to process and transmit an input stream of data according to aspects of the invention, implementing root non-orthogonal frequency division multiplexing (RNOFDM). Transmitter 501 comprises encoder 510, scrambler 511, a modulation mapper 512, an FFT or DFT module 514 (optional), a resource mapper 517, a transform 518, a cyclic prefix (CP) adder module 519 and a filter 520. Filter 520 may be one or more of various types of known filters, such as a raised-cosine time-domain window based filter, and filter 520 may be optionally applied. Scrambler 510 and encoder 511 may be optional. As seen in FIG. 5, the output of transmitter chain 501 is transmitted via antenna 550. In the case of a wired communication system, the output of transmitter chain 501 is transmitted via a communication wire or cable. One skilled in the art would know how to apply the single-in-single-out (SISO) transmitter chain 501 illustrated in FIG. 5 to a multiple-input-multiple-output (MIMO) application/environment (e.g., multiple "RNOFDM" SISO chains).

Figure 6:
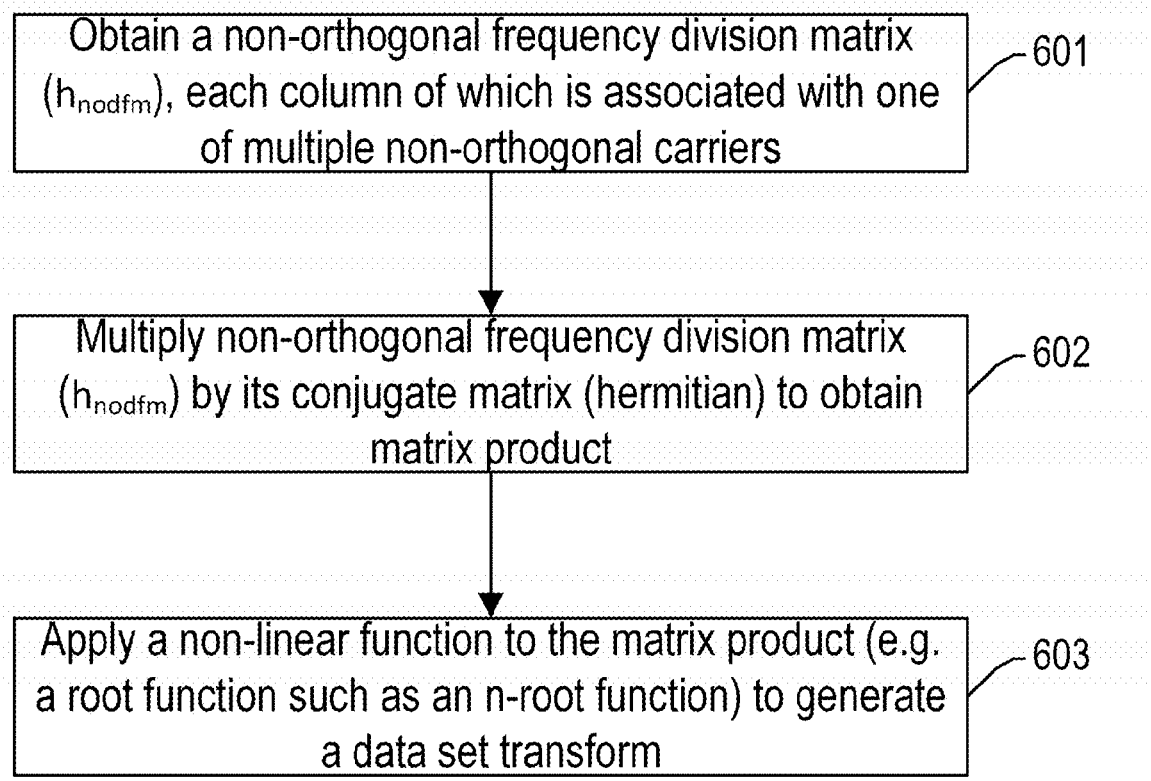
FIG. 6 is a flowchart illustrating an example method for generating a data set transform for use in implementing root non-orthogonal frequency division multiplexing (RNOFDM) according to an aspect of the invention.

FIG. 6 is a flowchart illustrating an exemplary method for generating a data set transform (such as the transform 400 of FIG. 4) for use in implementing root non-orthogonal frequency division multiplexing (RNOFDM) according to aspects of the invention. It should be noted that, in an aspect, the generation of a data set transform may be performed before operation of the communication system, a priori, such as for example before implementation of the transmitter chain. In an aspect, multiple data set transforms may be generated beforehand and then an appropriate one of the data set transforms can be selected during operation of the communications system. In step 601, a Non-Orthogonal Frequency Division Multiplexing (NOFDM) matrix, $h_{NOFDM}$, is defined, wherein each column of the matrix is associated with one of a multiple of non-orthogonal subcarriers.

In this regard, in order to increase the transmission rate of OFDM, the orthogonality condition that is imposed on the OFDM subcarriers may be relaxed. Several techniques are known in the art to generate a non-orthogonal modulation based on OFDM. In one example, the number of subcarriers that are multiplexed (i.e., transformed) into one symbol is chosen, beyond the number, N, of orthogonal subcarriers. The increase in the number of subcarriers is denoted by a multiple M, which is selected for convenience to be a power of 2. In other words, one OFDM symbol, $\vec{y}$, of duration T and consisting of N multiplexed orthogonal subcarriers, is replaced by one NOFDM symbol, $\vec{y}'$, also of duration T and consisting of NM multiplexed subcarriers. In this case, the NOFDM symbol, $\vec{y}'$ may be represented as:

$$\vec{y}' = h_{NOFDM} \vec{x}' \qquad (1)$$

Where $\vec{x}'$ ≡ NM×1 vector, is the input to the NOFDM multiplexer;

$\vec{y}'$ ≡ N×1 vector, is the output from the NOFDM multiplexer; and $h_{NOFDM}$ = N×NM matrix, is the NOFDM Matrix, defined as $$h_{NOFDM} \triangleq \frac{1}{\sqrt{NM}} \begin{bmatrix} 1 & 1 & 1 & \cdots & 1 \\ 1 & \omega^{\frac{1}{M}} & \omega^{\frac{2}{M}} & \cdots & \omega^{\frac{NM-1}{M}} \\ 1 & \omega^{\frac{2}{M}} & \omega^{\frac{4}{M}} & \cdots & \omega^{\frac{2(NM-1)}{M}} \\ \vdots & \vdots & \vdots & \ddots & \vdots \\ 1 & \omega^{\frac{N-1}{M}} & \omega^{\frac{2(N-1)}{M}} & \cdots & \omega^{\frac{(N-1)(NM-1)}{M}} \end{bmatrix} \qquad (2)$$

where $\omega \triangleq e^{\frac{j2\pi}{N}}$.

In other words, the $l^{th}$ column, $h_{NOFDM,l}$, of $h_{NOFDM}$, is a subcarrier which carries the information corresponding to the $l^{th}$ element of and $\vec{x}$, may be defined as:

$$h_{NOFDM,l} \triangleq \frac{1}{\sqrt{NM}} \begin{bmatrix} 1 \\ \omega^{\frac{l-1}{M}} \\ \omega^{\frac{2(l-1)}{M}} \\ \vdots \\ \omega^{\frac{(N-1)(l-1)}{M}} \end{bmatrix} \qquad (3)$$

$1 \leq l \leq NM$

Both output vectors, $\vec{y}$ and $\vec{y}'$, respectively, may be oversampled by a multiple equal to M, or equivalently, to force the total number of samples for both $\vec{y}$ and $\vec{y}'$ to equal NM using a sampling frequency, $f'_s$, equal to $Mf_s$ for both. The oversampling does not change the duration of the output vectors, $\vec{y}$ and $\vec{y}'$ since the oversampling is still equal to $$\frac{NM}{Mf_s} = \frac{N}{f_s} = T.$$

The choice of oversampling by a multiple equal to M forces $h_{NOFDM}$ to be square. In this scenario, oversampling the NOFDM symbol, $\vec{y}'$, by a multiple M corresponds to having a multiplexing matrix defined as:

$$h_{NOFDM} \triangleq \frac{1}{\sqrt{NM}} \begin{bmatrix} 1 & 1 & 1 & \dots & 1 \\ 1 & \omega^{\frac{1}{M}} & \omega^{\frac{2}{M}} & \dots & \omega^{\frac{NM-1}{M}} \\ 1 & \omega^{\frac{2}{M}} & \omega^{\frac{4}{M}} & \dots & \omega^{\frac{2(NM-1)}{M}} \\ \vdots & \vdots & \vdots & \ddots & \vdots \\ 1 & \omega^{\frac{NM-1}{M}} & \omega^{\frac{2(NM-1)}{M}} & \dots & \omega^{\frac{(NM-1)(NM-1)}{M}} \end{bmatrix} \quad (4)$$

where $h_{NOFDM}$=NM×NM square matrix, is the oversampled NOFDM Matrix;

$$\omega \triangleq e^{-j\frac{2\pi}{NM}};$$

and $\vec{y}'$=NM×1 vector, is the output vector from the NOFDM multiplexer.

In this case, the $l^{th}$ column of $h_{NOFDM}$, $h_{NOFDM,l}$, is a subcarrier which carries the information corresponding to the $l^{th}$ element of $\vec{x}'$, and may be which is defined as:

$$h_{NOFDM,l} \triangleq \frac{1}{\sqrt{NM}} \begin{bmatrix} 1 \\ \omega^{\frac{l-1}{M}} \\ \omega^{\frac{2(l-1)}{M}} \\ \vdots \\ \omega^{\frac{(NM-1)(l-1)}{M}} \end{bmatrix} \quad (5)$$

$1 \leq l \leq NM$

In step 602, the NOFDM matrix, $h_{NOFDM}$, is multiplied by its complex conjugate transpose matrix (i.e. Hermitian) to obtain a matrix product $h_{NOFDM}h_{NOFDM}^*$. In an aspect, in order to improve the spectral efficiency of NOFDM, in particular when the spectral threshold level is ≤−40 dBr, the variance between the eigenvalues of $h_{NOFDM}h_{NOFDM}^*$ may be reduced. One way to reduce the variance is by replacing $h_{NOFDM}$ with $$\sqrt[n]{h_{NOFDM}h_{NOFDM}^*},$$

or by replacing Equation (1) with:

$$\vec{y}' = \sqrt[n]{h_{NOFDM}h_{NOFDM}^*} \ \vec{x}' \quad (6)$$

where n is selected to be an integer. Such a modulation may be referred to as Root-NOFDM (RNOFDM). In an aspect, the product $h_{NOFDM}h_{NOFDM}^*$ corresponds to a square NM×NM matrix, and the duration of the RNOFDM symbol $\vec{y}^e$ is equal to that of the OFDM symbol $\vec{y}$, T.

In step 603, a non-linear function (e.g., a root function such as an $n^{th}$ root function $$\sqrt[n]{\square})$$

is applied to the matrix product to generate a data set transform (e.g., to generate $$\sqrt[n]{h_{NOFDM}h_{NOFDM}^*}).$$

The data set transform (e.g., transform module 400 of FIG. 4, and transform 518 of FIG. 5) may then be used to transform information elements (such as information element data set 410 of FIG. 4, and output of resource mapper 517 of FIG. 5) into an output samples data set (such as information element data set 420 of FIG. 4, and output of transform 518 of FIG. 5) for transmission according to RNOFDM, as described below with respect to FIG. 7 according to aspects of the invention.

Figure 7:
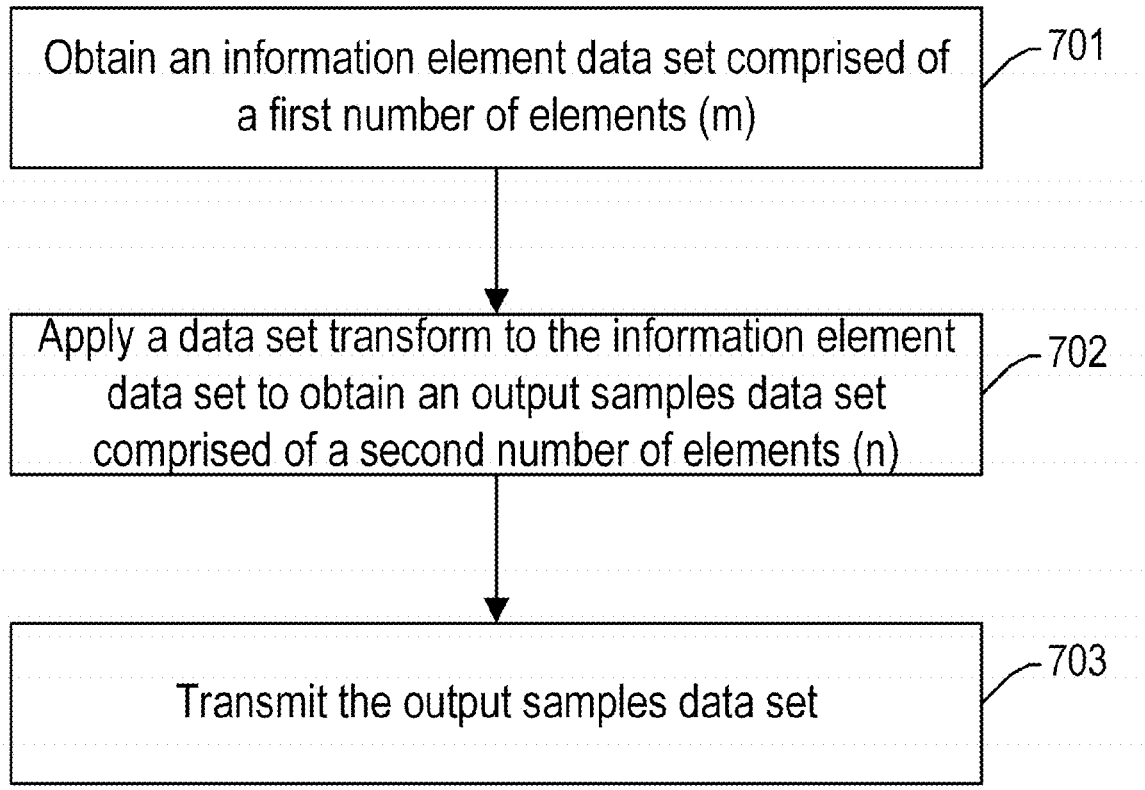
FIG. 7 is a flowchart illustrating an example method for applying a data set transform in the implementation of root non-orthogonal frequency division multiplexing (RNOFDM) according to an aspect of the invention.

FIG. 7 is a flowchart illustrating an exemplary method for applying a data set transform (such as transform module 400 of FIG. 4) in the implementation of RNOFDM according to an aspect of the invention. In step 701, an information element data set, $\vec{x}'$, is obtained or accessed, wherein the information element data set is comprised of a first number of elements.

A data set transform is applied to the information element data set in step 702 to obtain an output samples data set, $\vec{y}''$, comprised of a second number of elements M. The data set transform may, for example, be generated as described above with respect to FIG. 6.

In step 702, a filter (such as filter 520 of FIG. 5) may be optionally implemented. For example, in an aspect, a filter may be applied in which a raised-cosine time-domain window is used. A raised-cosine window is defined by its roll-off factor: the larger the roll-off factor of the window, the faster the rate of decay of its Fourier Transform. In an aspect, other types of windows may be used instead of the raised-cosine window. Examples of other windows include the Hamming window, the Hanning window, the Blackman-Harris window, and others. In addition, other techniques exist that may be used to speed the rate of decay of the power spectral density (PSD) of RNOFDM. Examples of such other techniques include the Filter Bank Multi-Carrier (FBMC) technique, which avoids using a Cyclic Prefix, and the Universal Filtered Multi-Carrier (UFMC) which is effective for short packets. FBMC performs a subcarrier filtering of the OFDM signal, while UFMC performs a sub-band filtering of the OFDM signal. Both techniques may be used for filtering the RNOFDM signal.

In an aspect, the PSD of NOFDM may be forced to decay below a spectral threshold using a cyclic Step-wise Gaussian Band Pass Filter (BPF) with a baseband-equivalent Transfer Function, H(f), which may be expressed mathematically as:

$$H(f) \triangleq \begin{cases} e^{\frac{-([f_n + \frac{0.5}{M}])^2}{2\sigma_f^2}} & \text{for } f_n \leq -\frac{0.5}{M} \\ 1 & \text{for } -\frac{0.5}{M} < f_n < \frac{0.5}{M} \\ e^{\frac{-([f_n + \frac{0.5}{M}])^2}{2\sigma_f^2}} & \text{for } f_n \geq +\frac{0.5}{M} \end{cases} \quad (7)$$

where $\sigma_f$ is the normalized standard deviation of the Gaussian filter, normalized by $f_s'$ and $f_n$ is the normalized frequency, also normalized by $f_s'$. It should be noted that other types of cyclic BPF exist and may be used instead of the Gaussian BPF in Equation (7) in other aspects. In aspects of the invention, the RNOFDM symbols described herein may be band-limited using the cyclic baseband-equivalent Band Pass Filter described in Equation (7).

In step 703, the output samples data set, $\vec{y}'$, is transmitted over a communications channel. In this manner, RNOFDM as described herein is utilized to achieve improved performance as compared to OFDM or known NOFDM techniques.

Figure 8:
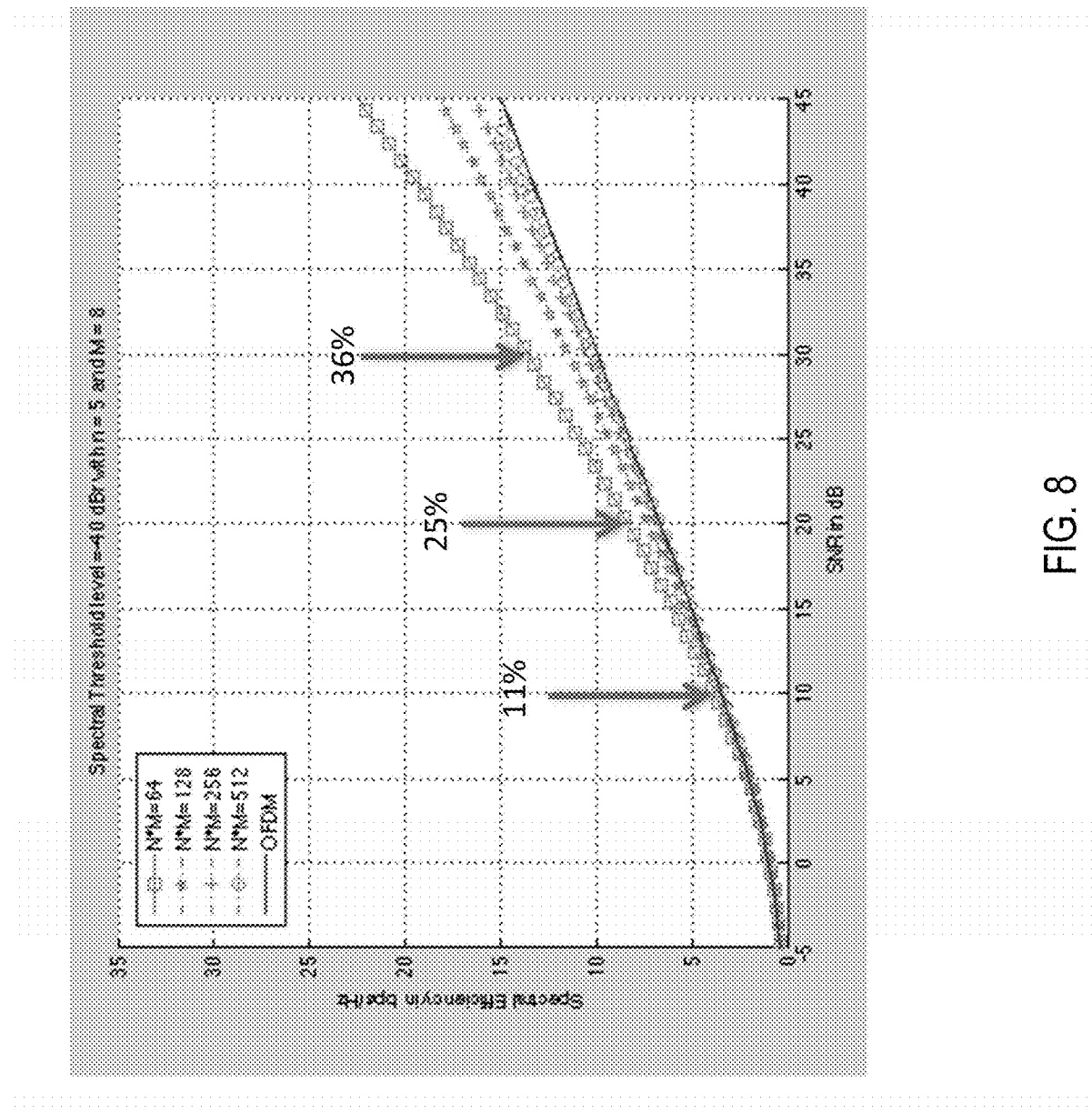
FIG. 8 is a graph depicting performance of RNOFDM in comparison to OFDM, according to an aspect of the invention.

In this regard, FIG. 8 is a graph depicting the performance of RNOFDM in comparison to OFDM, according to aspects of the invention. In FIG. 8, the spectral efficiency, $\eta_{OFDM}$, for the non-filtered OFDM signal using a raised-cosine window with a 12.5% roll-off factor (blue curves) is compared with that of the filtered RNOFDM signal using the BPF described in Equation (7) with $\sigma f=0.022097$ and using a raised-cosine time window with a 12.5% roll-off factor after taking into consideration their relative bandwidths, $$\left.\frac{W_{OFDM}}{W_{NOFDM}}\right|_{-40dBr},$$

defined at a spectral threshold level of −40 dBr, for NM=64, 128, 256, 512, M=8 and n=5. The relative improvements in spectral efficiency that NOFDM offers over OFDM are shown in FIG. 7, namely 11% at 10 dB SNR, 25% at 20 dB SNR and 36% at 30 dB SNR, for NM=64 subcarriers.

In one aspect, the performance results described above are obtained under the following example assumptions and constraints.

Example Assumptions:

A1: The signal, $\vec{y}'$, is transmitted using one antenna over a channel that is contaminated by an Additive White Gaussian Noise (AWGN), and is received by one antenna;

A2: The OFDM signals that are selected as bases to develop the RNOFDM signal have N=8, 16, 32 and 64 subcarriers;

A3: RNOFDM uses a multiple M=8 where NM is the number of subcarriers in the initial NOFDM signal and its number of samples;

A4: The duration, T, of the RNOFDM symbol is identical to the duration, T, of the OFDM symbol;

A5: The total signal energy used in one OFDM signal is identical to the total signal energy used in one NOFDM signal, which is also equal to the total signal energy used in one RNOFDM signal; and A6: Results in FIG. 8 are obtained for the spectral efficiency versus the received normalized signal-to-noise ratio (SNR) for the OFDM signal and the RNOFDM signal. The normalized signal-to-noise ratio (SNR) is obtained for both signals, the OFDM signal and the RNOFDM signal, by dividing their total SNR by N.

Example Constraint:

C1: The spectral threshold level is set at −40 dBr.

A summary of the spectral efficiency ratios, $$\left.\frac{\eta_{OFDM}}{\eta_{NOFDM}}\right|_{-40dBr},$$

is shown in Table III below with NM=64. From Table III, it may be seen that the improvements that Equation (6) offers over Equation (1) may reach a peak value when n=4

TABLE III

| | $\left.\frac{\eta_{OFDM}}{\eta_{NOFDM}}\right|_{-40\,dBr}$ @SNR = 10 dB, NM = 64 | $\left.\frac{\eta_{OFDM}}{\eta_{NOFDM}}\right|_{-40\,dBr}$ @SNR = 20 dB, NM = 64 | $\left.\frac{\eta_{OFDM}}{\eta_{NOFDM}}\right|_{-40\,dBr}$ @SNR = 30 dB, NM = 64 |
|---|---|---|---|
| n = 1 | 3% | 9% | 14% |
| n = 2 | 3% | 10% | 18% |
| n = 3 | 8% | 19% | 28% |
| n = 4 | 15% | 27% | 38% |
| n = 5 | 11% | 25% | 36% |
| n = 6 | 12% | 27% | 39% |

It should be noted that the above-described assumptions, constraints and performance data and comparisons are exemplary only and that aspects of the invention as described herein are not limited by such assumptions, constraints and performance data.

The foregoing systems and methods and associated devices and modules are susceptible to many variations. Additionally, for clarity and concision, many descriptions of the systems and methods have been simplified. For example, the figures generally illustrate one of each type of device (e.g., one access node, one terminal node), but a communication system may have many of each type of device. Similarly, descriptions may use terminology and structures of a specific wireless standard, such as WiFi or LTE. However, the disclosed systems, devices and methods are more broadly applicable to wireless and wired communication systems, including for example, to hybrid fiber-coax cable modem systems.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor. As used herein a processor may be a general purpose processor, a digital signal processor (DSP), an application specific integrated circuit (ASIC), a field programmable gate array (FPGA) or other programmable logic device, discrete gate or transistor logic, discrete hardware components, or any portion or combination thereof that is capable of performing the functions described herein. A general purpose processor can be a microprocessor, but in the alternative, the general purpose processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the claims.

What is claimed is:

1. A method for transmission by a transmitting node in a communication network using a plurality of non-orthogonal carriers, comprising:
    obtaining, by a processor in the transmitting node, an information element data set comprised of a first number of elements;
    applying, by the processor, a transform matrix to the information element data set to obtain an output samples data set comprised of a second number of elements of a non-orthogonal frequency division matrix (NOFDM) symbol associated with the plurality of non-orthogonal carriers, the transform matrix being based on a non-linear function applied to a non-orthogonal frequency division matrix comprised of a plurality of columns wherein each column is associated with one of the plurality of non-orthogonal carriers; and
    transmitting the NOFDM symbol through the plurality of non-orthogonal carriers from a transmitter in the transmitting node.

2. The method of claim 1, wherein the method further includes the step applying a filter to the output samples data set.

3. The method of claim 2, wherein the filter uses a raised-cosine time-domain window.

4. The method of claim 2, wherein the filter uses one of a Hamming window, a Hanning window and a Blackman-Harris window.

5. The method of claim 2, wherein the filter implements one of a Filter Bank Multi-Carrier method and a Universal Filtered Multi-Carrier method.

6. The method of claim 1, wherein the non-linear function is an n-root function.

7. The method of claim 1, wherein the transform matrix is a square matrix.

8. The method of claim 7, wherein the transform matrix is generated as a square matrix by oversampling the output samples data set by a subcarrier multiple.

9. The method of claim 1, wherein the communication network is a single-in-single-out communication network.

10. The method of claim 1, wherein the communication network is a multiple-input-multiple-output communication network.

11. The method of claim 1, further comprising selecting the transform matrix from a plurality of transform matrices.

12. A transmitting node in a communication network using a plurality of non-orthogonal carriers, comprising:
    an antenna for transmitting data using a plurality of non-orthogonal carriers;
    a memory storing a plurality of computer-executable instructions;
    a processor in communication with the memory, wherein the processor executes the plurality of computer-executable instructions to perform:
        obtaining an information element data set comprised of a first number of elements of a non-orthogonal frequency division matrix (NOFDM) symbol associated with the plurality of non-orthogonal carriers, and
        applying a transform matrix to the information element data set to obtain an output samples data set comprised of a second number of elements, the transform matrix being based on a non-linear function applied to a non-orthogonal frequency division matrix comprised of a plurality of columns wherein each column is associated one of the plurality of non-orthogonal carriers; and
    a transmitter in communication with the antenna, the processor and the memory, wherein the transmitter transmits the NOFDM symbol through the plurality of non-orthogonal carriers by using the antenna over the communication network.

13. The transmitting node of claim 12, further comprising a filter module which applies a filter to the output samples data set before transmission.

14. The transmitting node of claim 13, wherein the filter uses a raised-cosine time-domain window.

15. The transmitting node of claim 13, wherein the filter uses one of a Hamming window, a Hanning window and a Blackman-Harris window.

16. The transmitting node of claim 13, wherein the filter implements one of a Filter Bank Multi-Carrier method and a Universal Filtered Multi-Carrier method.

17. The transmitting node of claim 12, wherein the non-linear function is an n-root function.

18. The transmitting node of claim 12, wherein the transform matrix is a square matrix.

19. The transmitting node of claim 18, wherein the transform matrix is generated as a square matrix by oversampling the output samples data set by a subcarrier multiple.

20. The transmitting node of claim 12, wherein the communication network is a single-in-single-out communication network.

21. The transmitting node of claim 12, wherein the communication network is a multiple-input-multiple-output communication network.

22. The transmitting node of claim 12, wherein the plurality of computer-executable instructions cause the processor to further select the transform matrix from a plurality of transform matrices.

\* \* \* \* \*